Figure 1:
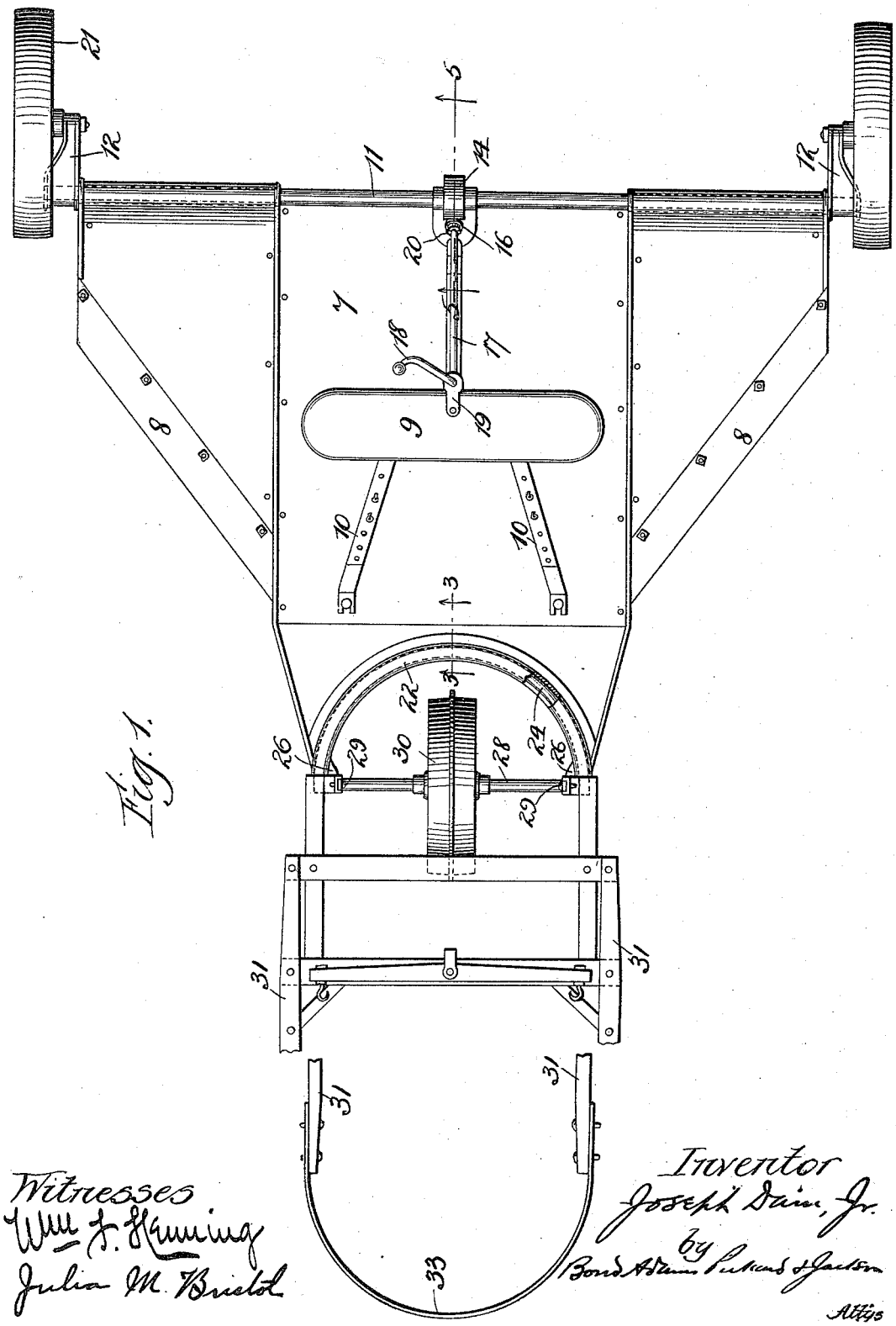

(No Model.) 3 Sheets—Sheet 1.

J. DAIN, Jr.
CORN HARVESTER.

No. 572,967. Patented Dec. 15, 1896.

Witnesses
Wm. F. Henning
Julia M. Bristol

Inventor
Joseph Dain, Jr.
by Bond Adams Pickard & Jackson
Attys (No Model.) 3 Sheets—Sheet 2.
J. DAIN, Jr.
CORN HARVESTER.
No. 572,967. Patented Dec. 15, 1896.
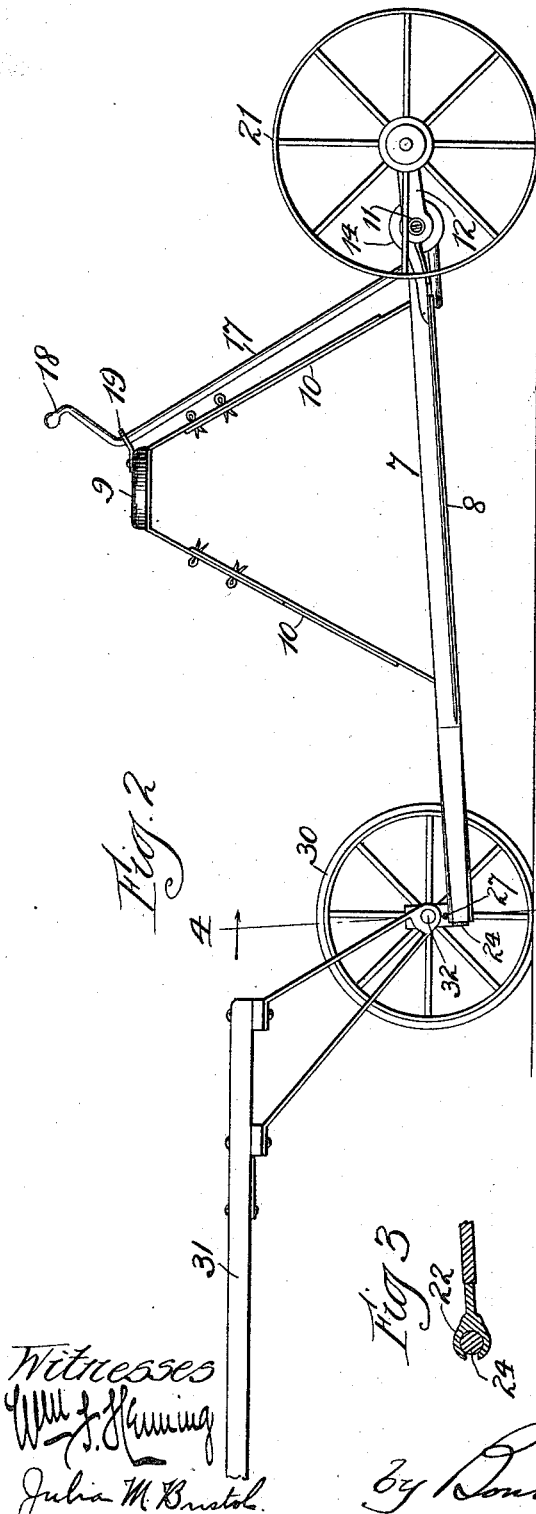
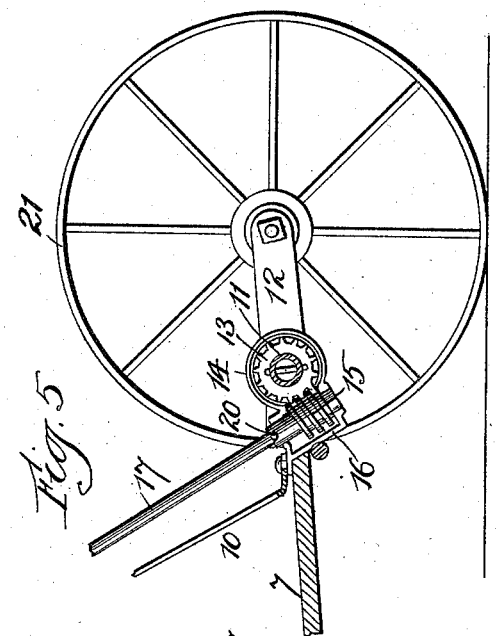
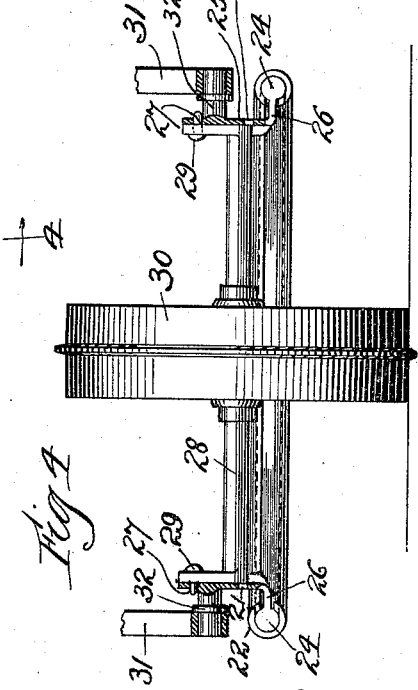
Witnesses
Inventor
Joseph Dain, Jr.

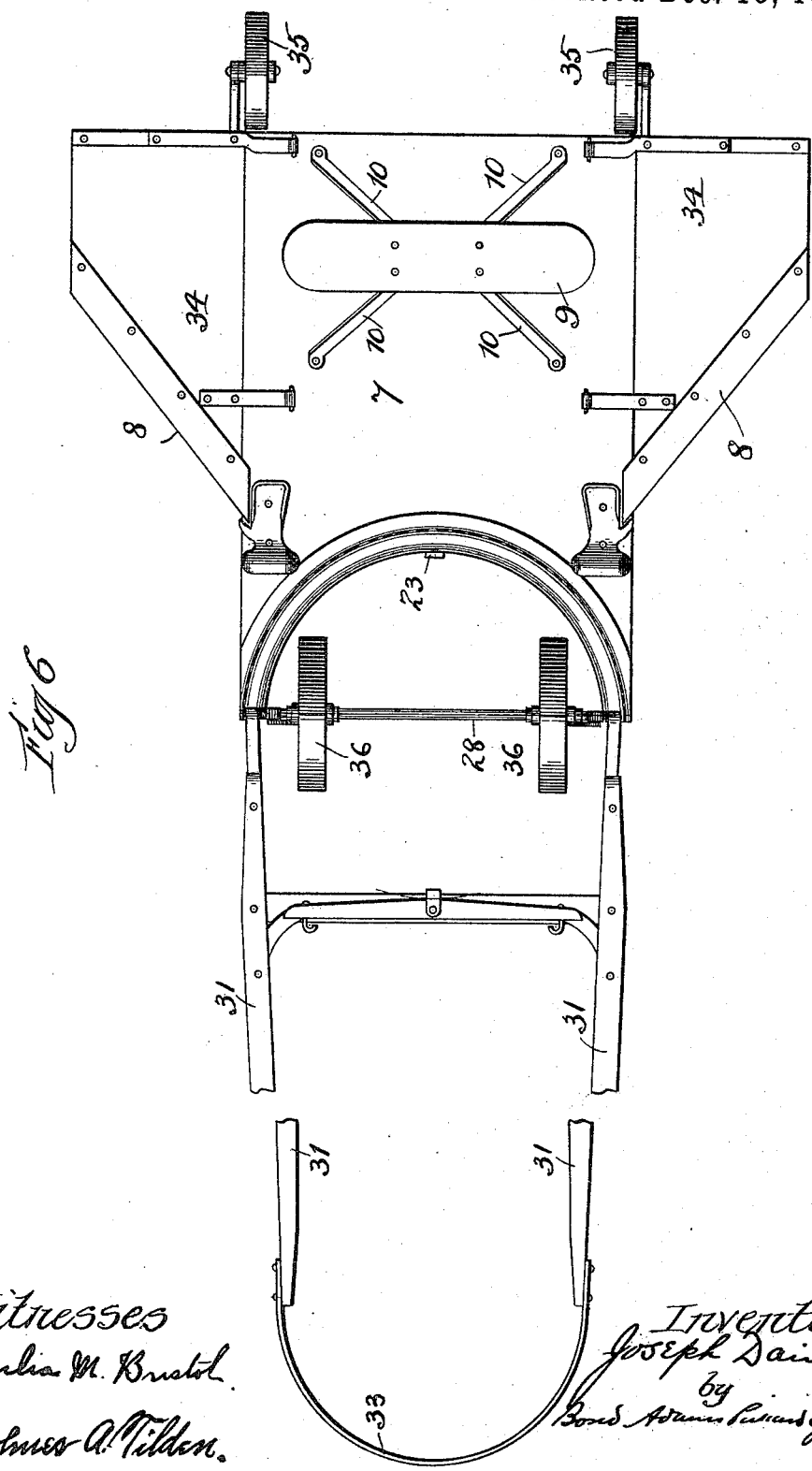

UNITED STATES PATENT OFFICE.

JOSEPH DAIN, JR., OF CARROLLTON, MISSOURI.

CORN-HARVESTER.

SPECIFICATION forming part of Letters Patent No. 572,967, dated December 15, 1896.

Application filed February 21, 1895. Serial No. 539,177. (No model.)

*To all whom it may concern:*

Be it known that I, JOSEPH DAIN, Jr., a citizen of the United States, residing at Carrollton, in the county of Carroll and State of Missouri, have invented certain new and useful Improvements in Corn-Harvesters, of which the following is a specification, reference being had to the accompanying drawings, in which—

Figure 1 is a top or plan view with a portion of the shafts cut away. Fig. 2 is a side elevation. Fig. 3 is a detail, being a cross-section upon line 3 3 of Fig. 1. Fig. 4 is an enlarged detail, being a partial vertical cross-section upon line 4 4 of Fig. 2. Fig. 5 is an enlarged detail, being a partial vertical longitudinal section upon line 5 5 of Fig. 1. Fig. 6 is a top or plan view of a modified form of my corn-harvester.

My invention relates to corn-harvesters, and particularly to that class of corn-harvesters which is designed for cutting corn in the field, and in which a machine consisting in the main of platform and supports mounted on wheels, with knives mounted upon each side of said platform, is driven through the field between the rows of corn, the knives cutting through the stalks as the machine is driven; and a man standing or sitting on each side of the machine gathers the cornstalks as the knives cut them off, and when the men have all they can handle in their arms they stop the machine and place the corn in the shock; then repeat the operation.

The invention consists in features of construction and novel combinations of parts in a corn-harvester, as hereinafter described and claimed.

In the drawings, 7 indicates a platform of any approved and ordinary form of construction.

8 indicates cutter-knives, which are secured to the platform and are of any approved form and construction.

9 indicates a seat supported upon standards 10.

11 indicates a shaft, which is journaled in the rear of the platform 7.

12 indicates arms projecting rearward from the axle to which the stub-axles are secured.

13 indicates a gear which is keyed to the shaft 11 in a suitable housing 14. (See Fig. 5.)

15 indicates a worm, which is journaled in a suitable housing 16, mounted upon the rear of the platform 8 and adapted to engage with the gear 13.

17 indicates a crank-shaft provided with a crank-handle 18 upon its upper end and connected to the worm 15, so as to rotate the same, as is best shown in Fig. 5.

21 indicates rear wheels which are mounted upon the outer ends of the stub-axles 12.

By rotating the crank-shaft 17 by means of the handle 18 the worm 15 is rotated, which, engaging with the gear 13, rotates it, and the shaft 11, which by the stub-axles 12 being journaled in the wheels 21, the rear of the platform 7 is lowered or raised.

22 indicates a semicircular guide or slide-box, which is mounted upon and secured to the forward end of the platform 7. The guide or slide-box 22 is open upon the inner side of the curve throughout its entire length, the opening being somewhat narrower than the space inside the slide-box, as is best shown in Fig. 4, for the purpose of retaining within the slide-box the curved guide hereinafter described. I prefer to place across the middle of the slide-box a small block 23, (see Fig. 6,) secured to said slide-box, for the purpose of preventing the shafts from being turned around too far, as hereinafter described.

The guide or slide-box 22 may be constructed of metal or any other suitable material, and may be formed of one or two parts, as may be preferred, and secured to the platform in any suitable manner.

24 (see Figs. 1, 3, and 4) indicates a semicircular rod or guide, which may be formed of gas-pipe or any other suitable material bent to conform to the curve of the slide-box 22 and of such shape and size as to slide freely within it.

25 (see Fig. 4) indicates supports which are secured at each end of the semicircular guide 24, said supports being formed at right angles, as is best shown in Fig. 4, and having their horizontal portions 26 of such shape and size as to project through and move freely in the slot or opening in the front surface of the slide-box or guide 22. The vertical portions of said supports 25 are provided with one or more openings 27.

28 indicates an axle, which is secured to the supports 25 by means of pins or bolts 29, passing into the holes 27. By mounting the axle 28 so that the pins 29 engage with the upper or lower holes 27 the axle 28 may be raised or lowered, enabling the front end of the platform to be raised or lowered, as desired.

30 indicates a wheel which is journaled upon the axle 28.

31 indicates shafts, which are pivotally mounted upon pintles 32, secured to the supports 25.

33 indicates a bail which is secured to the front ends of the shafts 31, passing around from one shaft to the other in such manner as to part the corn in front of the horse and prevent its being entangled with the shafts 31 and enabling the corn to be guided back along the shafts toward the cutter-blades 8.

In Fig. 6 I have shown a modified form of my machine in which the platform 7 is provided with hinged wings 34, to which are secured the cutter-knives 8, having rear wheels 35, mounted in any approved manner behind the platform 7. As the platform 7, wings, knives, and wheels are of the ordinary and usual construction, it is not necessary to describe them fully here. Upon the front axle 28, which is mounted in a semicircular guide or slide-box in the same manner as previously described in referring to the other construction, are mounted two forward or guide wheels 36, spaced some distance apart in order to prevent the tilting of the front portion of the platform in the form of construction shown in Fig. 6.

By means of the semicircular guide or slide-box containing the semicircular guide-rod, as above described, a firm support is afforded for the front portion of the platform, at the same time enabling the shafts to be turned around almost at right angles to the longitudinal line of the machine, as above described.

The purpose of the block 23, above described, is to stop the turning of the front axle at a point nearly at right angles with the longitudinal line of the machine, in order to prevent the horses from coming back in contact with the cutter-knives.

That which I claim as my invention, and desire to secure by Letters Patent, is—

1. In a corn-harvester, the combination of a platform provided with cutting-knives on its rear outer sides, a semicircular slide-box mounted on the forward portion of said platform and having a slot in its front edge, a semicircular sliding bar arranged to move freely within said slide-box, vertical supports secured to the ends of said sliding bar, an axle adjustably journaled in said supports, and one or more wheels mounted on said axle, substantially as described.

2. In a corn-harvester, the combination of the platform supported on wheels, the cutting-knives mounted on the rear outer sides of the platform, a semicircular slide-box mounted on the forward portion of the platform and having in its front edge a slot extended from end to end of said box, a semicircular sliding bar arranged to move freely within said slide-box, vertical supports secured to the ends of said sliding bar, an axle for the forward wheel or wheels adjustably mounted in said supports, and a stop located centrally in the slide-box to limit the turning of the axle, substantially as described.

JOSEPH DAIN, Jr.

Witnesses:
J. C. BRAMHALL,
C. M. WODAL.